(12) United States Patent
Mansfield et al.

(10) Patent No.: US 9,122,285 B2
(45) Date of Patent: Sep. 1, 2015

(54) VIRTUAL THERMOSTAT SYSTEM AND METHOD

(75) Inventors: Carl Mansfield, Camas, WA (US); Daniel J. Park, Beaverton, OR (US); David Elrod, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 464 days.

(21) Appl. No.: 13/539,057

(22) Filed: Jun. 29, 2012

(65) Prior Publication Data

US 2013/0013119 A1 Jan. 10, 2013

Related U.S. Application Data

(63) Continuation-in-part of application No. 13/432,735, filed on Mar. 28, 2014, now Pat. No. 9,069,361, which is a continuation-in-part of application No. 13/178,723, filed on Jul. 8, 2011, now Pat. No. 8,725,303.

(51) Int. Cl.
*G06F 1/26* (2006.01)
*G05D 23/19* (2006.01)
*F24F 11/00* (2006.01)

(52) U.S. Cl.
CPC ..... *G05D 23/1934* (2013.01); *F24F 2011/0075* (2013.01)

(58) Field of Classification Search
CPC .......... G05D 23/1927; G05D 23/1932; G05D 23/1934; G05D 23/19; F24F 2011/0075; H02J 3/14; Y04S 20/222; Y04S 20/224; Y02B 70/3225

USPC .......... 700/86, 276, 277, 278, 286, 291, 295, 700/296, 297, 299, 300; 236/91 R, 91 D, 236/91 E

See application file for complete search history.

(56) References Cited

U.S. PATENT DOCUMENTS

| 4,136,392 | A |   | 1/1979  | Westphal et al. |          |
|-----------|---|---|---------|-----------------|----------|
| 4,357,665 | A |   | 11/1982 | Korff           |          |
| 4,477,733 | A |   | 10/1984 | Herdeman        |          |
| 5,539,633 | A | * | 7/1996  | Hildebrand et al. | 700/32 |
| 5,682,949 | A | * | 11/1997 | Ratcliffe et al. | 165/209 |
| 6,349,883 | B1| * | 2/2002  | Simmons et al. | 236/46 R |
| 7,177,728 | B2| * | 2/2007  | Gardner         | 700/295  |
| 7,231,424 | B2|   | 6/2007  | Bodin et al.    |          |
| 7,460,930 | B1| * | 12/2008 | Howell et al.   | 700/295  |
| 7,565,225 | B2| * | 7/2009  | Dushane et al.  | 700/276  |

(Continued)

*Primary Examiner* — Charles Kasenge
(74) *Attorney, Agent, or Firm* — Law Office of Gerald Maliszewski; Gerald Maliszewski

(57) ABSTRACT

A virtual thermostat system and method are provided. The method accepts commands via a virtual thermostat interface for establishing temperature set points for a plurality of zones. Energy consumption information is also accepted from a plurality of energy consumption units. Each unit consumes energy at an associated peak power to supply a controlled temperature medium to a corresponding zone. The method also accepts temperature measurements for each zone. Then, consumption commands are sent to each energy consumption unit in response to associated zone temperature set points, while insuring that a combined peak power of the energy consumption units is less than a maximum peak power threshold. In one aspect, the virtual thermostat accepts temperature measurements from a plurality of physical thermostats, each associated with an energy consumption unit. Then, consumption commands are relayed to the energy consumption units via associated physical thermostats.

16 Claims, 5 Drawing Sheets

(56) References Cited

U.S. PATENT DOCUMENTS

| | | | |
|---|---|---|---|
| 7,706,928 B1* | 4/2010 | Howell et al. | 700/295 |
| 7,797,084 B2 | 9/2010 | Miwa | |
| 7,809,472 B1* | 10/2010 | Silva et al. | 700/277 |
| 7,908,116 B2* | 3/2011 | Steinberg et al. | 702/182 |
| 8,374,725 B1* | 2/2013 | Ols | 700/277 |
| 8,412,654 B2* | 4/2013 | Montalvo | 706/15 |
| 8,463,453 B2* | 6/2013 | Parsons, Jr. | 700/295 |
| 2005/0143865 A1* | 6/2005 | Gardner | 700/291 |
| 2007/0079620 A1* | 4/2007 | Lee | 62/186 |
| 2007/0282547 A1* | 12/2007 | Howell et al. | 702/60 |
| 2009/0187499 A1* | 7/2009 | Mulder et al. | 705/30 |
| 2010/0088261 A1* | 4/2010 | Montalvo | 706/15 |
| 2010/0241285 A1 | 9/2010 | Johnson et al. | |
| 2010/0282857 A1* | 11/2010 | Steinberg | 236/49.3 |
| 2011/0006123 A1* | 1/2011 | Sharp | 236/49.3 |
| 2011/0118890 A1* | 5/2011 | Parsons | 700/295 |
| 2011/0290893 A1* | 12/2011 | Steinberg | 236/49.3 |

* cited by examiner

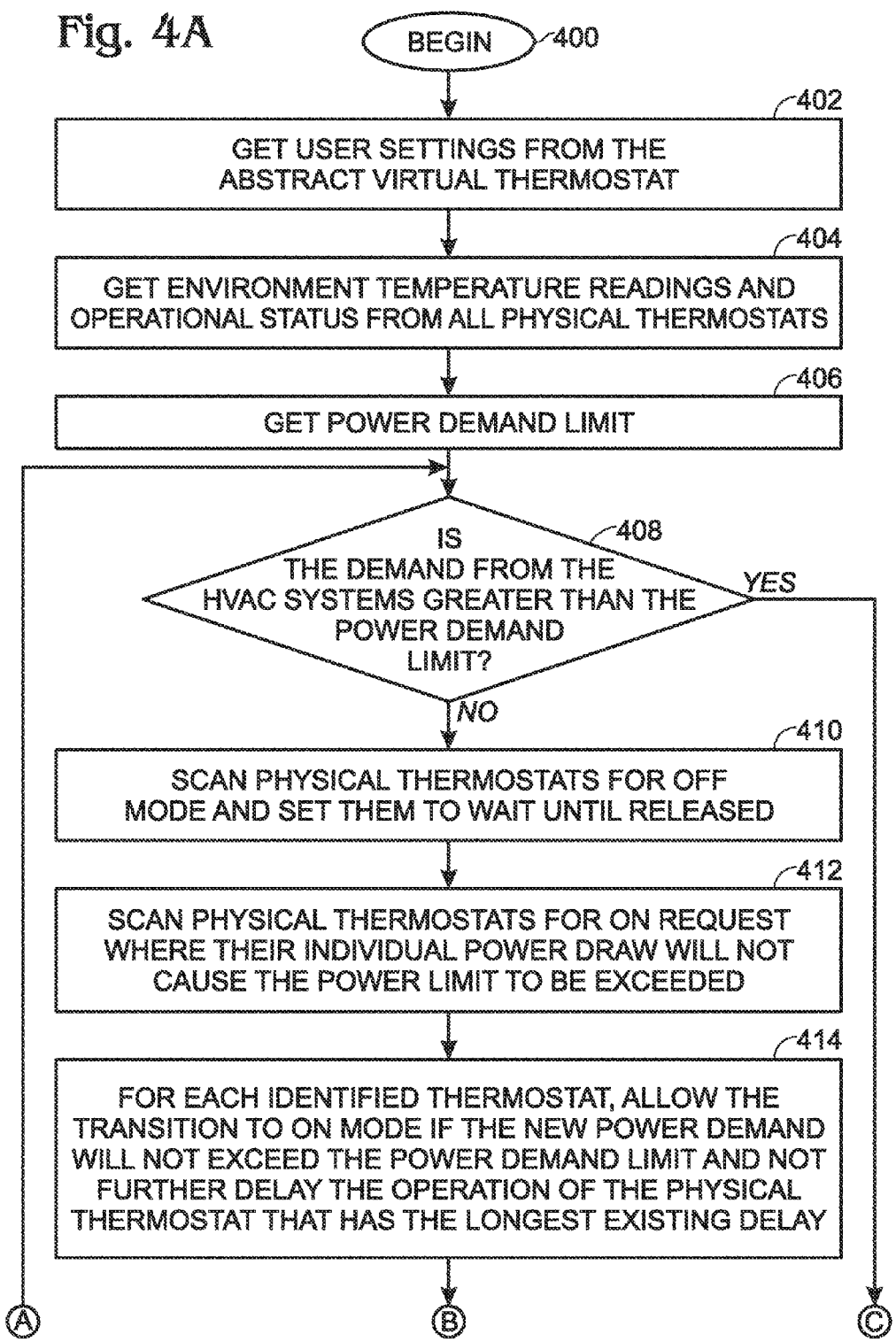

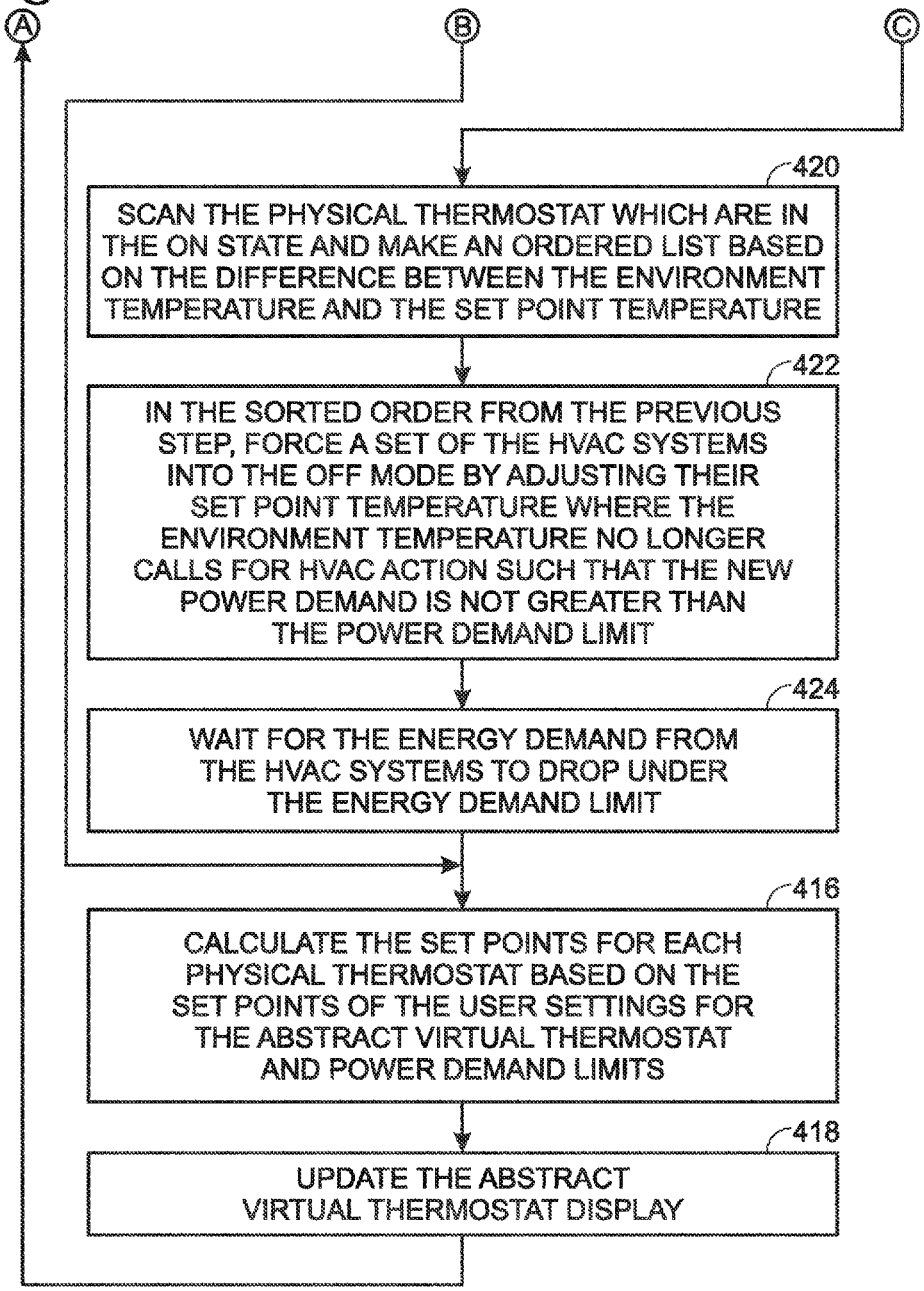

VIRTUAL THERMOSTAT SYSTEM AND METHOD

RELATED APPLICATIONS

This application is a Continuation-in-Part of an application entitled, THERMOSTAT WITH SET POINT RANGE FEEDBACK, invented by Vitaliy Merkulov et al., Ser. No. 13/432,735, filed Mar. 28, 2012;

which is a Continuation-in-Part of an application entitled, SYSTEM AND METHOD FOR THE MULTI-DIMENSIONAL REPRESENTATION OF ENERGY CONTROL, invented by Daniel Park et al., Ser. No. 13/178,723, filed Jul. 8, 2011. All these applications are incorporated herein by reference.

BACKGROUND OF THE INVENTION

1. Field of the Invention

This invention generally relates to thermostat temperature control and, more particularly, to a system and method for combining a plurality of physical thermostat controls into a single virtual thermostat for the purpose of controlling peak power usage.

2. Description of the Related Art

Typical electric service to a commercial operation includes billing not only for electric energy usage, but also the peak power demand in each billing period. It is the peak power demand billing that can lead to especially expensive service billing. There exist today energy management systems that manage peak electric demand by forcing energy consumers to lower consumption states and by coordinating their ON-times by schedule. However distributed, when independent heating, ventilation, and air conditioning (HVAC) systems are under independent thermostatic control, there exists a significant probability that the units will be consuming electric power simultaneously, even though their simultaneous operation is not required to maintain the proper environmental temperatures.

For example, a fitness center in an apartment complex has four heat pumps to keep the air temperature at a comfortable level for the tenants. Each heat pump is responsible for a specific zone with in the fitness center. Each heat pump has a separate thermostat that is located in its zone. Three of the four heat pumps consume 1.8 kWh (1 ton) when in the ON mode. One heat pump draws 3.6 kWh (2 tons) when in the ON mode because it is responsible for the zone near the south facing windows that also contains the treadmills.

In the late afternoons during the month of April, the fitness center heat pumps typically have a 25% ON duty cycle. The late afternoon is the typical peak demand period for the facilities common areas, so any reduction in peak power demand is reflected in the April electric billing. When the fitness center's heat pumps are not coordinated, there is a significant probability that multiple heat pumps will be active and the peak electric charge will be unnecessarily increased in response to the demand level of four active HVAC units. Since only a 25% ON duty cycle is needed to maintain the room temperature, there is enough time for each system in sequence to perform its work when the other systems are in their OFF portion of the cycle.

It would be advantageous if the combined peak power to multiple physical thermostats could be efficiently controlled using a central virtual thermostat.

SUMMARY OF THE INVENTION

Disclosed herein are a virtual thermostat system and method having supervisory control over what would otherwise be independent thermostats, so that peak power demand is reduced, and the billing for the peak power demand is likewise reduced. The control of the set of independent thermostats and their associated HVAC equipment is maintained using a single abstract virtual thermostat. The abstract virtual thermostat presents a simplified status and control interface to the user while also identifying the set of HVAC systems that participate in peak demand management. The abstract virtual thermostat allows a few control inputs to be propagated to many physical thermostats, converting the control inputs to the specific controls necessary for the diverse set of thermostats in their specific environments. It also presents an aggregate view for the states of the individual thermostats in the set. Systems existing today allow the user to view and control individual thermostats remotely, but not manage them as an abstract set.

Thus, a set of thermostats are managed by a virtual aggregate thermostat to reduce the maximum power demand by controlling the start time of their ON periods. A set of physical thermostats can be presented to the user as a single virtual thermostat with aggregated temperature reading and heating, ventilation, and air conditioning (HVAC) states. Commands input by the user on the virtual aggregate thermostat are converted into the necessary commands for each physical thermostat. In response, the physical thermostats maintain the proper operational cycling times and safety parameters per the specifications of the HVAC system which they control.

Accordingly, a virtual thermostat method is provided that may be enabled as software instructions stored in a non-transitory memory and executed by a processor. The method accepts commands via a virtual thermostat interface for establishing temperature set points for a plurality of zones. Energy consumption information is also accepted from a plurality of energy consumption units. Each unit consumes energy at an associated peak power to supply a controlled temperature medium to a corresponding zone. The method also accepts temperature measurements for each zone. Then, consumption commands are sent to each energy consumption unit in response to associated zone temperature set points, while insuring that a combined peak power of the energy consumption units is less than a maximum peak power threshold. In one aspect, the virtual thermostat accepts temperature measurements from a plurality of physical thermostats, each associated with an energy consumption unit. Then, consumption commands are relayed to the energy consumption units via associated physical thermostats.

In another aspect, the virtual thermostat insures that the combined peak power of the energy consumption units is less than the maximum peak power threshold by adjusting temperature set points to minimize errors between temperature measurements and temperature set points for selected zones. The result is to delay consumption commands enabling an energy consumption unit in a corresponding zone. For example, subsequent to accepting information that an energy consumption unit has been disabled, the energy consumption unit is added to the tail of an activation queue, and consumption commands are sent to enable an energy consumption unit at a head of the queue.

Additional details of the above-described method and a virtual thermostat system are provided below.

BRIEF DESCRIPTION OF THE DRAWINGS

FIGS. 4A and 4B are a detailed flowchart illustrating dynamic load balancing in a community of energy systems using a virtual thermostat.

DETAILED DESCRIPTION

Figure 1:
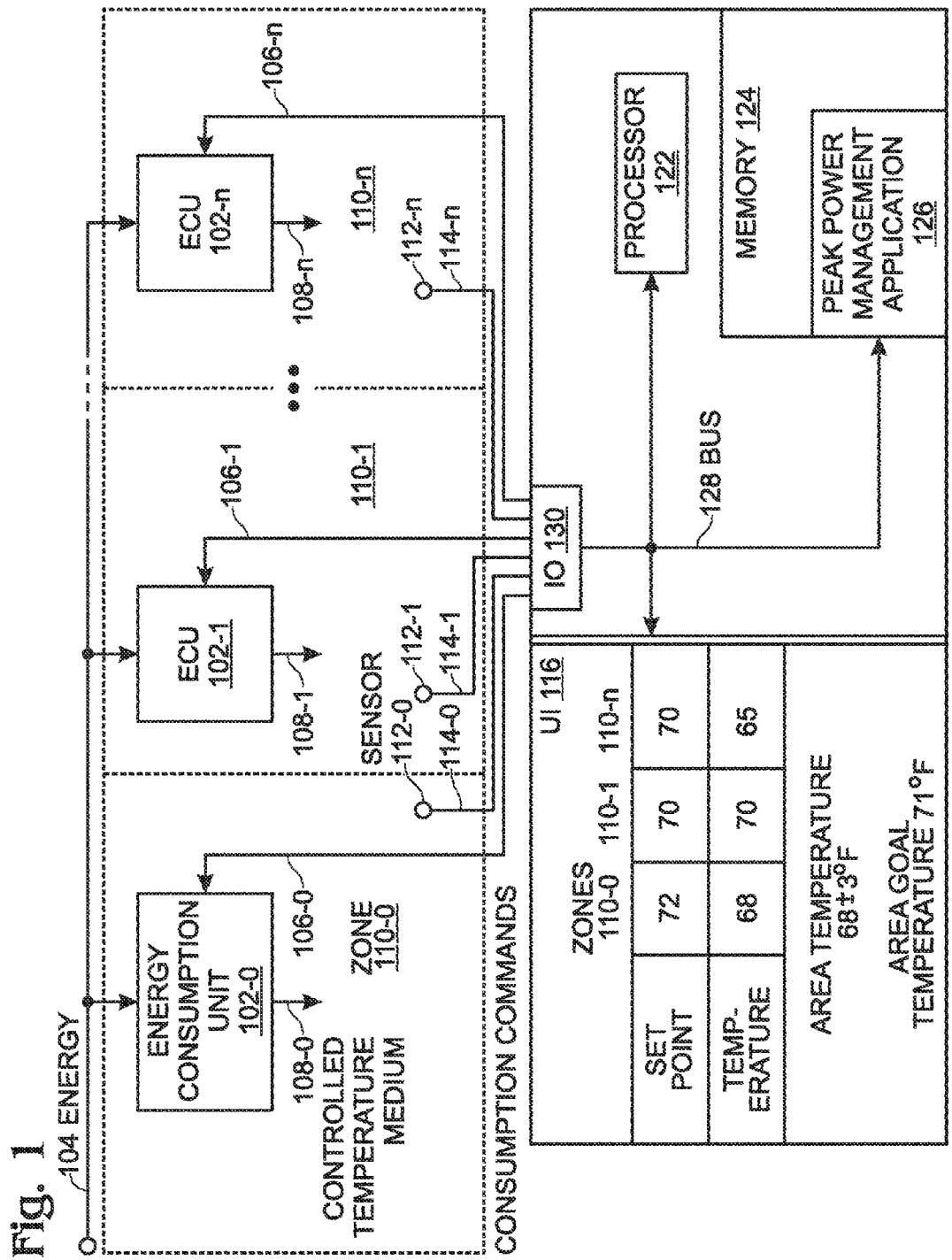
FIG. 1 is a schematic block diagram of a virtual thermostat system.

FIG. 1 is a schematic block diagram of a virtual thermostat system. The system 100 comprises a plurality of energy consumption units (ECUs) 102-$f$) through 102-$n$, where n is an integer number variable not limited to any particular value. One example of an energy consumption unit is an HVAC system. However, the system 100 can be enabled to control the peak power used by other types of devices. Each energy consumption unit has an input on line 104 to accept an energy resource consumed at an associated peak power. Continuing the example of an HVAC system, the energy resource of line 104 may be AC power supplied, for example, by a public utility. Each energy consumption unit has an input, respectively on lines 106-0 through 106-$n$ to accept consumption commands. Each energy consumption unit has an output, respectively 108-0 through 108-$n$ to supply a controlled temperature medium to an associated zone 110-0 through 110-$n$. Continuing with the HVAC example, the controlled temperature medium would be heated or cooled air. A sensor 112-0 through 112-$n$ is associated with each zone, having an output, respectively on lines 114-0 through 114-$n$ to supply a temperature measurement responsive to the controlled temperature medium.

A virtual thermostat user interface (UI) 116 accepts zone temperature set point inputs from a user, and presents temperature measurements for the plurality of zones. The system 100 also comprises a processor 122 and a non-transitory memory 124. A peak power management application 126 is stored as a sequence of software instructions in the memory 124 and executed by the processor 122. The peak power management application 126 manages each energy consumption unit in, via input/output (IO) 130, in response to its associated zone temperature set point, while insuring that a combined peak power of the energy consumption units is less than a maximum peak power threshold. The peak power management has an interface connected to the virtual thermostat UI 116 on line (bus) 128. The virtual thermostat UI 116 displays information supplied by the peak power management application 126 such as the average temperature for the plurality zones, the maximum zone temperature measurement, and the minimum zone temperature measurement. The UI 116 may also allow the user to configure the individual zone temperature setpoints or aggregated values, such as an overall area temperature goal setpoint. That is, the virtual thermostat UI 116 may accept user commands for an area, where the commands are area goal temperature and/or deviation from area goal temperature, and where the area comprises a plurality of zones.

As used in this application, the terms "component," "module," "system," "application", and the like may be intended to refer to an automated computing system entity, such as hardware, firmware, a combination of hardware and software, software, software stored on a computer-readable medium, or software in execution. For example, a component may be, but is not limited to being a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer device typically employs a computer system with a bus 128 or other communication mechanism for communicating information, and a processor 122 coupled to the bus 128 for processing information. The computer system may also include a main memory 124, such as a random access memory (RAM) or other dynamic storage device, coupled to the bus 128 for storing information and instructions to be executed by processor 122. These memories may also be referred to as a computer-readable medium. The execution of the sequences of instructions contained in a computer-readable medium may cause a processor to perform some of the steps associated with managing peak energy consumption. Alternatively, some or all of these functions may be performed in hardware, such as in an application specific integrated circuit (ASIC) or field programmable gate array (FPGA). The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge such as an SD card or USB dongle, or any other medium from which a computer can read.

Figure 2:
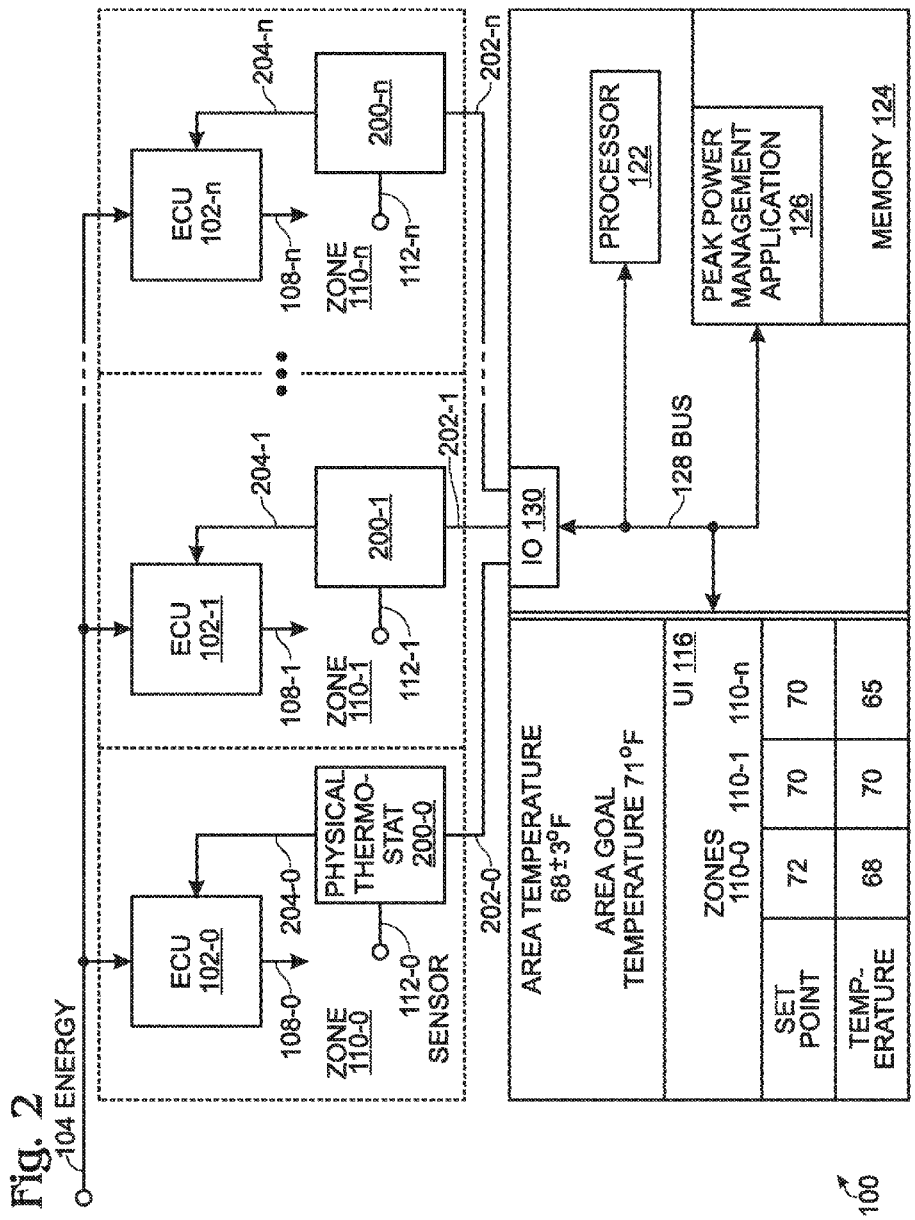
FIG. 2 is a schematic block diagram depicting a variation of the system shown in FIG. 1.

FIG. 2 is a schematic block diagram depicting a variation of the system shown in FIG. 1. In this aspect, the system 100 further comprises a plurality of physical thermostats 200-0 through 200$n$. Each physical thermostat accepts temperature measurements from a corresponding sensor, and relays the temperature measurements to the peak power management application via lines 202-0 through 202-$n$, and via IO 130. Further, the physical thermostats relay consumption commands from the peak power management application 126 to an associated energy consumption unit via lines 204-0 through 204-$n$.

In one aspect, the peak power management application 126 insures that the combined peak power of the energy consumption units is less than the maximum peak power threshold by adjusting the operating modes of the thermostats, or by adjusting the temperature set points to minimize errors between temperature measurements and temperature set points for selected zones. In other words, for selected zones the peak power management application 126 temporarily switches the thermostat mode to OFF, or reduces the gap between measured temperature and temperature set point, so that the energy consumption units in the selected zones are less likely to be enabled than other energy consumption units. In this manner, the peak power management application 126 delays an energy consumption unit being enabled in response to minimizing the error between the temperature measurement and the temperature set point for the corresponding zone. A thermostat configured to both Heat and Cool modes typically needs the setpoint to be adjusted near the actual temperature to disable the unit. The thermostat mode can also be changed to either Heat Only or Cool Only and then the temperature setpoint need only be set on the inactive side of the trigger temperature.

More explicitly, subsequent to an energy consumption unit being disabled, the peak power management application adds the energy consumption unit to a tail of an activation queue (e.g. by adjusting the set point). Then, the energy consumption unit at a head of the activation queue is activated. For example, the energy unit is activated by returning its set point to its "normal" setting—the setting selected on the UI 116.

In one aspect, a plurality of energy consumption units at the head of the activation queue can be enabled, when the combined peak power of the plurality of energy consumption units is less than the maximum peak power threshold. Alternatively, if the peak power management application 126 determines that the combined peak power of the plurality of energy consumption units exceeds the maximum peak power threshold, it determines an error between the temperature measurement and temperature set point for each corresponding zone, and adds the energy consumption unit associated with a minimum error from the plurality to the tail of the activation queue. Then, the combined peak power is redetermined for the remaining energy consumption units. If the redetermined combined peak power is less than the maximum peak threshold, the remaining units are permitted to operate. Otherwise, the energy consumption unit associated with a minimum error from the remaining units is added to the tail of the activation queue, and the redetermination process is repeated.

Functional Description

In contrast to the example presented in the Background Section, where units from a system of four heats pumps are permitted to operate independently without regard to total peak power usage, in the system described above the ON cycle times are coordinated such that peak power demand by the sum of the energy heat pumps is reduced in this case only one HVAC unit load need be enabled at any particular time.

The four physical thermostats are coordinated by a single abstract virtual thermostat which operates on a separate processor with a graphical user interface. The user sets the environmental parameters for the overall fitness center space, such as general temperature goals. These parameters are then translated by the abstract virtual thermostat into actual set points and modes for the physical thermostats. The average temperature or range of temperatures in the fitness center is displayed by the abstract virtual thermostat from the direct temperature readings from the physical thermostats in the fitness center.

More generally, it is common for facilities to have multiple HVAC systems all of which manage the temperature of a facility's environment. Often, each HVAC system has an independent thermostatic control for the portion of the facility's environment (zone) for which it is responsible. Over time each thermostat independently calls for heating (or cooling) of its zone with the net effect that the total facility's temperature is kept to within preset bounds.

HVAC systems have a duty cycle where during the ON period, the environment is driven by the HVAC system towards a set point temperature. During the OFF period, the environment's temperature is allowed to drift from the set point until the temperature difference between the set point and the zone temperature becomes large enough to trigger a transition to the ON period. In a facility with multiple independent HVAC systems, the ON and OFF periods of the various devices' duty cycles are not coordinated. In this case there is a significant probability that more than one HVAC system will he ON at the same time.

When power demand by the HVAC systems is unconstrained by external power limits, then uncoordinated operation is simple and effective. However, power may be constrained for reasons such as electric utility demand charges where the electric utility bills for the peak power usage in each billing period, or by electric supply limits due to wiring or generation. When power demand is constrained, the system described herein coordinates the ON cycles of the set of HVAC systems such that a minimum of systems are ON simultaneously at any one time. In addition, power constraints on the total system determine how many HVAC systems may be ON simultaneously.

When the sum of the ON proportion of the duty cycles of all the HVAC units requires more time than can be accommodated sequentially (requiring overlapping ON times), then the HVAC systems are requesting more ON time than can be serialized without reducing their effective ON period and, therefore, their HVAC work. This results in the HVAC systems not being able to optimally maintain the desired set point temperatures in all zones.

When the system is constrained by a maximum power demand, the number of simultaneous HVAC units ON is limited by the sum of energy draw of each unit. There may be, for example, a mix of HVAC unit sizes such as 1 Ton, 1.5 Ton and 2 Ton units. Thus, when the power demand limit is near the power demand of the 2 ton unit, only the 2 ton or 1.5 ton unit may be on. However, 2 of the 1 Ton units may be ON simultaneously and meet the power demand constraint. The system described above manages which units may be on such that every unit has a fair amount of ON time and that the sum of the energy draw of all ON units does not exceed the maximum power threshold limit.

Thus, a plurality of individual thermostats are aggregated by one abstract thermostat that controls the start times on the individual thermostats, manages the configuration of the individual thermostats, displays the aggregated state of the measured environmental temperatures, and displays the aggregated HVAC states. The abstract thermostat is presented to the user as a virtual thermostat with HVAC controls and status. Any changes to the controls of the virtual aggregate thermostat are translated to control commands for each of the physical thermostats (such as temperature set points). Statuses reported by the individual thermostats to the virtual aggregate thermostat are combined into a status for display to the user which shows an overview or summary of the physical thermostat reports. For example, the temperature readings from all of the physical thermostats may be displayed as an average temperature or it may be displayed as a range of temperatures by the virtual aggregate thermostat. Another example may be that the ON status for the set of thermostats is displayed as 3 out of 5 HVAC units being ON, or that 60% of the MAC capacity is active.

The control of the physical thermostat ON periods may be either allowed or delayed by the peak power management application. Depending on the power demand constraints in effect, the peak power management application permits a physical thermostat to go to the ON mode if the power constraint is not violated. The physical thermostat then stays in the ON mode until the decision is made at the local physical thermostat to go into the OFF mode. At that time, the virtual thermostat permits the next set of thermostats (if any) in its activation queue to go to the ON mode, if it does not violate the maximum peak energy constraint in one aspect, the activation queue is a simple round robin style selection algorithm. However more sophisticated selection algorithms are available which allow for a greater number of low power HVAC units to operate without undue delay (fairness) of the high powered HVAC units. This is a resource fitting problem where the object is to evenly spread the power load as much as possible over time, and keep the ON period delays as short as possible.

Figure 3:
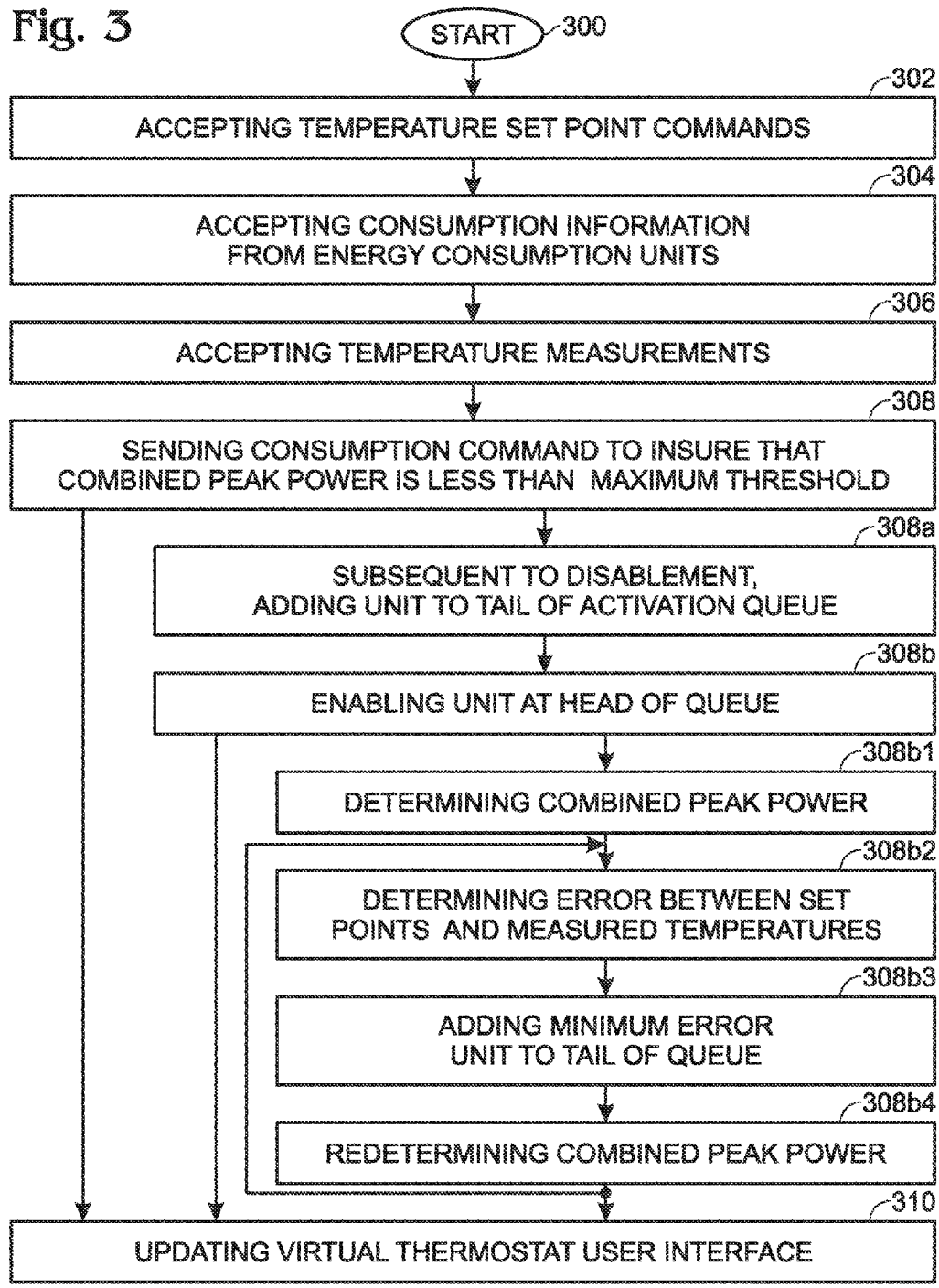
FIG. 3 is a flowchart illustrating a virtual thermostat method enabled as software instructions stored in a non-transitory memory and executed by a processor.

FIG. 3 is a flowchart illustrating a virtual thermostat method enabled as software instructions stored in a non-transitory memory and executed by a processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 300.

Step 302 accepts commands via a virtual thermostat interface for establishing temperature set points for a plurality of zones. In one aspect, Step 302 accepts user commands for an area, where the commands are the area goal temperature and/or the deviation from area goal temperature, and where the area comprises a plurality of zones. Step 304 accepts energy consumption information from a plurality of energy consumption units. Each unit consumes energy at an associated peak power to supply a controlled temperature medium to a corresponding zone. Step 306 accepts temperature measurements for each zone. In one aspect, temperature measurements are accepted from a plurality of physical thermostats, each associated with an energy consumption unit. Step 308 sends consumption commands to each energy consumption unit in response to associated zone temperature set points, while insuring that a combined peak power of the energy consumption units is less than a maximum peak power threshold. In one aspect, the consumption commands are relayed to the energy consumption units via associated physical thermostats. Step 310 sends information to the virtual thermostat user interface such as, the average temperature for the plurality zones, the maximum zone temperature measurement, the minimum zone temperature measurement, or a combination of the above-mentioned information.

In another aspect, Step 308 insures that the combined peak power of the energy consumption units is less than the maximum peak power threshold by adjusting temperature set points to minimize errors between temperature measurements and temperature set points for selected zones. More explicitly, adjusting temperature set points to minimize errors between temperature measurements and temperature set points for selected zones means delaying consumption commands to enable an energy consumption unit in a corresponding zone.

For example, insuring that the combined peak power of the energy consumption units is less than the maximum peak power threshold may include the following substeps. Step 308a, subsequent to accepting information that an energy consumption unit has been disabled, adds the energy consumption unit to a tail of an activation queue. Step 308b sends consumption commands to enable an energy consumption unit at a head of the activation queue.

In one aspect, Step 308h enables a first plurality of energy consumption units at the head of the activation queue, when the combined peak power of the first plurality of energy consumption units is less than the maximum peak power threshold. Then, additional substeps may he provided. If Step 308b1 determines that the combined peak power of the first plurality of energy consumption units exceeds the maximum peak power threshold, the Step 308b2 determines an error between the temperature measurement and temperature set point for each corresponding zone. Step 308b3 adds the energy consumption unit associated with a minimum error from the first plurality to the tail of the activation queue. Step 308h4 redetermines the combined peak power.

FIGS. 4A and 4B are a detailed flowchart illustrating dynamic load balancing in a community of energy systems using a virtual thermostat. The flowchart begins at Step 400. In Step 402 user settings are obtained from the virtual thermostat. In Step 404 temperature readings and status are obtained from a plurality of physical thermostats. In Step 406 the power demand limit (maximum peak power threshold) is obtained. In Step 408 a determination is made as to whether the HVAC demands are greater than the demand limit established in Step 406. If no, Step 410 determines which units are OFF, and they are maintained in that state until released. Step 412 scans for HVAC ON requests. In Step 414, each ON request is permitted if granting the request does not exceed the demand limit, or cause further delay in the operation of the physical thermostat having the longest existing delay. Step 416 calculates set points based upon user selected set points and the power demand limits. Step 418 updates the virtual thermostat UI.

If Step 408 determines that the HVAC system requests are greater than the power demand limit, Step 420 scans systems in the ON state, and makes an ordered list based upon the difference between ON system set points and actual temperature measurements. Step 422 uses the ordered list to turn HVAC systems to OFF by adjusting their set points. Step 424 determines if the systems are operating below the power demand limit, and if so, the flowchart proceeds to Step 416.

A virtual thermostat system and method have been provided for managing the peak power loads to a plurality of energy consumption units. Examples of a thermostat type control have been presented to illustrate management of temperature. However, the invention is not limited to merely temperature management. Other variations and embodiments of the invention will occur to those skilled in the art.

We claim:

1. A virtual thermostat system comprising:
   a plurality of energy consumption units, each energy consumption unit having an input to accept an energy resource consumed at an associated peak power, an input to accept consumption commands, and an output to supply a controlled temperature medium to an associated zone;
   a sensor associated with each zone, having an output to supply a temperature measurement responsive to the controlled temperature medium;
   a virtual thermostat user interface (UI) to accept zone temperature set point inputs from a user, and to present temperature measurements for the plurality of zones;
   a processor;
   a non-transitory memory; and,
   a peak power management application stored as a sequence of software instructions in the memory and executed by the processor, the peak power management application having an interface connected to the virtual thermostat UI for managing each energy consumption unit in response to its associated zone temperature set point, while insuring that a combined peak power of the energy consumption units is less than a maximum peak power threshold as follows:

subsequent to an energy consumption unit being disabled, adding the energy consumption unit to a tail of an activation queue; and, enabling an energy consumption unit at a head of the activation queue.

2. The system of claim 1 further comprising:

a plurality of physical thermostats, each physical thermostat accepting temperature measurements from a corresponding sensor, relaying the temperature measurements to the peak power management application, and relaying consumption commands from the peak power management application to an associated energy consumption unit.

3. The system of claim 1 wherein the virtual thermostat UI displays information supplied by the peak power management application selected from a group consisting of an average temperature for the plurality zones, a maximum zone temperature measurement, and a minimum zone temperature measurement.

4. The system of claim 2 wherein the peak power management application insures that the combined peak power of the energy consumption units is less than the maximum peak power threshold by adjusting temperature set points to minimize errors between temperature measurements and temperature set points for selected zones.

5. The system of claim 4 wherein the peak power management application delays an energy consumption unit being enabled in response to minimizing the error between the temperature measurement and the temperature set point for the corresponding zone.

6. The system of claim 1 wherein enabling the energy consumption unit at the head of the activation queue includes enabling a first plurality of energy consumption units at the head of the activation queue, when the combined peak power of the first plurality of energy consumption units is less than the maximum peak power threshold.

7. The system of claim 1 wherein the virtual thermostat UI accepts user commands for an area, where the commands are selected from a group consisting of area goal temperature and deviation from area goal temperature, and where the area comprises a plurality of zones.

8. The system of claim 6 wherein the peak power management application determines that the combined peak power of the first plurality of energy consumption units exceeds the maximum peak power threshold, determines an error between the temperature measurement and temperature set point for each corresponding zone, adds the energy consumption unit associated with a minimum error from the first plurality to the tail of the activation queue, and redetermines the combined peak power.

9. A virtual thermostat method, enabled as software instructions stored in a non-transitory memory and executed by a processor, the method comprising:

accepting commands via a virtual thermostat interface for establishing temperature set points for a plurality of zones in a facility;

accepting energy consumption information from a plurality of energy consumption units, each consuming energy at an associated peak power to supply a controlled temperature medium to a corresponding zone;

accepting temperature measurements for each zone;

sending consumption commands to each energy consumption unit in response to associated zone temperature set points, while insuring that a combined peak power of the energy consumption units is less than a maximum peak power threshold as follows:

subsequent to accepting information that an energy consumption unit has been disabled, adding the energy consumption unit to a tail of an activation queue; and, sending consumption commands to enable an energy consumption unit at a head of the activation queue.

10. The method of claim 9 wherein accepting temperature measurements includes accepting temperature measurements from a plurality of physical thermostats, each associated with an energy consumption unit; and, wherein sending consumption commands includes relaying consumption commands to the energy consumption units via associated physical thermostats.

11. The method of claim 10 further comprising:

sending information to the virtual thermostat user interface, where the information is selected from a group consisting of an average temperature for the plurality zones, a maximum zone temperature measurement, and a minimum zone temperature measurement.

12. The method of claim 10 wherein insuring that the combined peak power of the energy consumption units is less than the maximum peak power threshold includes adjusting temperature set points to minimize errors between temperature measurements and temperature set points for selected zones.

13. The method of claim 12 wherein adjusting temperature set points to minimize errors between temperature measurements and temperature set points for selected zones includes delaying consumption commands to enable an energy consumption unit in a corresponding zone.

14. The method of claim 9 wherein sending consumption commands to enable the energy consumption unit at the head of the activation queue includes enabling a first plurality of energy consumption units at the head of the activation queue, when the combined peak power of the first plurality of energy consumption units is less than the maximum peak power threshold.

15. The method of claim 14 wherein sending consumption commands to enable the energy consumption unit at the head of the activation queue includes:

determining that the combined peak power of the first plurality of energy consumption units exceeds the maximum peak power threshold;

determining an error between the temperature measurement and temperature set point for each corresponding zone;

adding the energy consumption unit associated with a minimum error from the first plurality to the tail of the activation queue; and, redetermining the combined peak power.

16. The method of claim 9 wherein accepting commands via the virtual thermostat interface for establishing temperature set points includes accepting user commands for an area, where the commands are selected from a group consisting of area goal temperature and deviation from area goal temperature, and where the area comprises a plurality of zones.

* * * * *

UNITED STATES PATENT AND TRADEMARK OFFICE
CERTIFICATE OF CORRECTION

PATENT NO.       : 9,122,285 B2
APPLICATION NO.  : 13/539057
DATED            : September 1, 2015
INVENTOR(S)      : Carl Mansfield et al.

It is certified that error appears in the above-identified patent and that said Letters Patent is hereby corrected as shown below:

In the Claims

In column 9, at line 56, claim 9, the words "in a facility" have been printed, which is in error. Claim 9 should read as follows:

9. A virtual thermostat method, enabled as software instructions stored in a non-transitory memory and executed by a processor, the method comprising:
    accepting commands via a virtual thermostat interface for establishing temperature set points for a plurality of zones;
    accepting energy consumption information from a plurality of energy consumption units, each consuming energy at an associated peak power to supply a controlled temperature medium to a corresponding zone;
    accepting temperature measurements for each zone;
    sending consumption commands to each energy consumption unit in response to associated zone temperature set points, while insuring that a combined peak power of the energy consumption units is less than a maximum peak power threshold as follows:
    subsequent to accepting information that an energy consumption unit has been disabled, adding the energy consumption unit to a tail of an activation queue; and,
    sending consumption commands to enable an energy consumption unit at a head of the activation queue.

Signed and Sealed this
Twelfth Day of January, 2016

Michelle K. Lee
*Director of the United States Patent and Trademark Office*